(12) United States Patent
Damron

(10) Patent No.: US 7,502,910 B2
(45) Date of Patent: Mar. 10, 2009

(54) SIDEBAND SCOUT THREAD PROCESSOR FOR REDUCING LATENCY ASSOCIATED WITH A MAIN PROCESSOR

(75) Inventor: Peter C. Damron, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 799 days.

(21) Appl. No.: 10/352,495

(22) Filed: Jan. 28, 2003

(65) Prior Publication Data

US 2004/0148491 A1    Jul. 29, 2004

(51) Int. Cl.
*G06F 15/00* (2006.01)
*G06F 15/76* (2006.01)

(52) U.S. Cl. ............... 712/34; 712/207; 712/235
(58) Field of Classification Search ............ 712/34, 712/207, 235
See application file for complete search history.

(56) References Cited

U.S. PATENT DOCUMENTS

| | | | |
|---|---|---|---|
| 4,442,487 A * | 4/1984 | Fletcher et al. ............ 711/122 |
| 5,475,824 A * | 12/1995 | Grochowski et al. ........ 712/206 |
| 5,600,810 A | 2/1997 | Ohkami | |
| 5,812,811 A * | 9/1998 | Dubey et al. ............... 712/216 |
| 5,974,520 A | 10/1999 | Huang | |
| 6,154,828 A | 11/2000 | Macri et al. | |
| 6,321,296 B1 * | 11/2001 | Pescatore ................... 711/118 |
| 6,397,326 B1 * | 5/2002 | Horton et al. .............. 712/240 |
| 6,684,820 B1 | 2/2004 | Mohamed et al. | |
| 6,895,497 B2 * | 5/2005 | Fetzer et al. ............... 712/215 |
| 6,948,052 B2 | 9/2005 | Nguyen et al. | |

| | | | |
|---|---|---|---|
| 2004/0128489 A1 * | 7/2004 | Wang et al. ............... 712/235 |
| 2004/0148489 A1 | 7/2004 | Damron | |

FOREIGN PATENT DOCUMENTS

| | | |
|---|---|---|
| EP | 0 652 510 A | 5/1995 |
| WO | WO 96/20440 | 7/1996 |

(Continued)

OTHER PUBLICATIONS

Eric Rotenberg, Karthik Sundaramoorthy, Zach Purser "Slipstream Processors: Improving both Performance and Fault Tolerance" Nov. 2000.*

(Continued)

*Primary Examiner*—Niketa I Patel
*Assistant Examiner*—Jesse R Moll
(74) *Attorney, Agent, or Firm*—Osha • Liang LLP

(57) ABSTRACT

A sideband scout thread processing technique is provided. The sideband scout thread processing technique utilizes sideband information to identify a subset of processor instructions for execution by a scout thread processor. The sideband information identifies instructions that need to be executed to "warm-up" a cache memory that is shared with a main processor executing the whole set of processor instructions. Thus, the main processor has fewer cache misses and reduced latencies. In one embodiment, a system includes a first processor for executing a sequence of processor instructions, a second processor for executing a subset of the sequence of processor instructions, and a cache shared between the first processor and the second processor. The second processor includes sideband circuitry configured to identify the subset of the sequence of processor instructions to execute according to sideband information associated with the sequence of processor instructions.

56 Claims, 6 Drawing Sheets

FOREIGN PATENT DOCUMENTS

| | | |
|---|---|---|
| WO | WO 96/29645 A | 9/1996 |
| WO | WO 01/52061 | 7/2001 |

OTHER PUBLICATIONS

John Hennessy, David Patterson "Computer Organization & Design The Hardware/Software Interface" 1998.*

Dean Tullsen, Susan Eggers, Joel Emer, Henry Levy, Jack Lo, Rebecca Stamm "Exploiting Choice: Instruction Fetch and Issue on an Implementable Simultaneous Multithreading Processor" May 1996.*

Moshovos, Andreas, et al., "Slice-Processors: An Implementation of Operation-Based Prediction," ICS, '01 Sorrento, Italy, ACM 2001 1-58113-410-x/01/06, pp. 321-334.

Liao, Steve S. W., et al., "Post-Pass Binary Adaptation for Software-Based Speculative Precomputation," PLDI '02, Jun. 17-19, 2002, Berlin, Germany, ACM 1-58113-463-0/02/0006, pp. 117-128.

Sakalay, F.E., "Storage Hierarchy Control System", IBM Technical Disclosure Bulletin, IBM Corp., New York, vol. 15, No. 4, Sep. 1, 1972, pp. 1100-1101.

Biglari-Abhari, M., et al. "Improving Binary Compatibility in VLIW Machines through Compiler Assisted Dynamic Rescheduling", Proceedings of the 26th Euromicro Conference, Los Alamitos, CA, IEEE Comput.Soc., vol. 1, pp. 386-393, Sep. 5-7, 2000.

Colwell, Robert P., et al., "A VLIW Architecture for a Trace Scheduling Compiler," 1987 ACM 0-89791-238-1/87/1000-0180, pp. 180-192.

Conte, Thomas M., et al., "Instruction Fetch Mechanisms for VLIW Architectures with Compressed Encodings," 1996 IEEE, 1072-4451/96, pp. 201-211.

Ebcioglu, Kemal, et al., "VLIW Compilation Techniques in a Superscalar Environment," SIGPLAN 94-6/94, Orlando, FL, 1994 ACM 0-89791-662-x/94/0006, pp. 36-48.

Jouppi, Norman P., and Wall, David W., "Available Instruction-Level Parallelism for Superscalar and Superpipelined Machines," 1989 ACM 0-89791-300-0/89/0004/0272, pp. 272-282.

Park, Seongbae, et al., "Evaluation of Scheduling Techniques on a SPARC-Based VLIW Testbed," 1997 IEEE, 1072-4451/97, pp. 104-113.

Patterson, David, and John Hennessy, "Computer Organization & Design, The Hardware/Software Interface," 1998, pp. 445, 544, 545, and 580.

* cited by examiner

SIDEBAND SCOUT THREAD PROCESSOR FOR REDUCING LATENCY ASSOCIATED WITH A MAIN PROCESSOR

BACKGROUND

1. Field of the Invention

This invention relates to the field of processors and more particularly to the use of a scout thread processor to prefetch data into caches for a main thread processor.

2. Description of the Related Art

Computer systems typically include, amongst other things, a memory system and one or more processors and/or execution units. The memory system serves as a repository of information, while a processor reads information from the memory system, operates on the information, and stores results to the memory system. A memory system can include one or more caches, main memory, and disk drives. Caches hold most recently accessed information and have low access latencies. Because main memory can have an access latency of 100 cycles or more, information is ideally stored in cache or in internal registers on the processor.

A cache is a small, fast memory, located close to the processor that holds the most recently accessed code or data. A cache hit occurs when the processor finds requested content (data/instruction) in the cache. In the case of a cache miss, the processor needs to load the content from the main memory. The typical wait time for a processor, before it resumes processing, is between fifty to one hundred cycles. Access times can be even longer if the processor must contend with other devices for accessing memory. The amount of time the processor is idle due to cache misses can be significant, for example, as high as 80%.

While the memory access latency is a design concern for computer system designers, processing power typically is not. Advances in Very Large Scale Integration (VLSI) technology provide an increased number of transistors on a single die over older technologies. There is now enough space on integrated circuits to put more than one processor on a single chip. These chips with multiple processors are called chip multi-processors (CMPs). Alternatively, the additional space can be utilized by multi-threaded processors utilizing symmetric multi-threading (SMT) wherein the multiple threads share pipeline resources. A parallelized program (one that contains multiple threads of execution) can take advantage of the CMP or SMT system to improve the performance of the program. A non-parallelized, single threaded program has no easy way to utilize the extra processors on a CMP or SMT system and thus has a performance disadvantage.

Scout thread processing has been proposed as technique to improve performance by reducing the occurrence of delays due to memory access latency. Scout thread processing utilizes the processing power of an otherwise idle processor. A scout thread can be executed on a processor several cycles ahead of a main thread that is executed on another processor or during a stall in the main thread. A processor that executes the scout thread is referred to as the scout thread processor. The main thread contains a sequence of instructions, typically from the executable file of the program. The scout thread contains a subset of the main thread's sequence of instructions. The scout thread does not include the entire set of main thread instructions, but includes only, for example, instructions that access memory and calculate addresses. Thus, the scout thread processing brings data into the cache, resulting in the main thread processor having fewer cache misses and therefore shorter latencies. Even if scout thread execution is only a few cycles ahead of main thread execution, those few cycles improve the main thread execution time. The scout thread "warms-up" the caches for the main thread, but otherwise has no visible side-effect.

One proposed way of creating a scout thread is to create a "slice" of the normal program that just contains the code to form the addresses and to do the pre-fetching of the data. A scout thread program includes a subset of the instructions in the main thread. For example, the scout thread can include program control and memory access operations but not floating point instructions from the main program.

Another proposed way of creating a scout thread is to utilize a hardware mechanism that automatically detects portions of the code to be executed on the scout thread processor. Circuitry is provided on the scout thread processor that identifies instructions performing address generation and executes those instructions. The synchronization of the main thread and the scout thread is triggered off of a cache miss— the scout circuitry uses information stored about address generation, executes a stream of instructions that will generate the next few addresses and fetches the corresponding data into the cache. This type of scout thread can execute on the same processor as the main thread and therefore benefit from information about which instructions (of the main thread program) to execute.

SUMMARY

A sideband scout thread processing technique is provided. The sideband scout thread processing technique utilizes sideband information to identify a subset of processor instructions for execution by a scout thread processor. The sideband information identifies instructions to be executed to "warm-up" a cache memory that is shared with a main processor executing the whole set of processor instructions by bringing data and instructions into the caches. Because the scout thread program shares instructions with the main thread program, there is an increased potential for the scout thread to timely prefetch information for the main thread. Thus, the main processor has fewer cache misses and reduced latencies.

Accordingly, in some embodiments, a system includes a first processor for executing a sequence of processor instructions, a second processor for executing a subset of the sequence of processor instructions, and a cache shared between the first processor and the second processor. The second processor includes sideband circuitry configured to identify the subset of the sequence of processor instructions to execute according to sideband information associated with the sequence of processor instructions.

In some embodiments, the sideband information further identifies synchronization information for synchronization between the first processor and second processor.

In some embodiments, the second processor communicates branch prediction information to the first processor.

In some embodiments, the second processor has fewer functional units than the first processor.

In some embodiments, the subset of the sequence of processor instructions consists of instructions that access memory and calculate addresses.

In some embodiments, the sideband information is a sequence of instructions stored on computer readable media with the sequence of processor instructions.

In some embodiments, the sideband circuitry includes a sideband program counter and a sideband translation look-aside buffer such that the sideband program counter and the sideband translation look-aside buffer work in conjunction to track and translate an instruction address to the corresponding sideband information address.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED
EMBODIMENT(S)

A sideband scout thread processing technique is provided. The sideband scout thread processing technique utilizes sideband information to identify a subset of processor instructions for execution by a scout thread processor. The sideband information identifies instructions that need to be executed to "warm-up" a cache memory that is shared with a main processor executing the whole set of processor instructions. Thus, the main processor has fewer cache misses and reduced latencies. A sideband compiler or other software tool produces sideband information corresponding to executable code (also referred to as binary or object code). Alternatively, a programmer produces sideband information at the assembly level while programming the source code. Sideband information can be stored in the same file as program executable code or can be one or more separate files. The sideband information is ignored by processors without scout thread processing capability providing backward compatibility for the program executable code.

The description that follows presents a series of systems, apparatus, methods and techniques that facilitate the sideband scout thread processing technique. While much of the description herein assumes a single process or thread context, some realizations in accordance with the present invention provide sideband scout thread processing customizable for multiple processors of a multiprocessor, each process and/or each thread of execution. Accordingly, in view of the above, and without limitation, certain exemplary exploitations are now described.

Sideband Scout Thread Processing Environment

Figure 1:
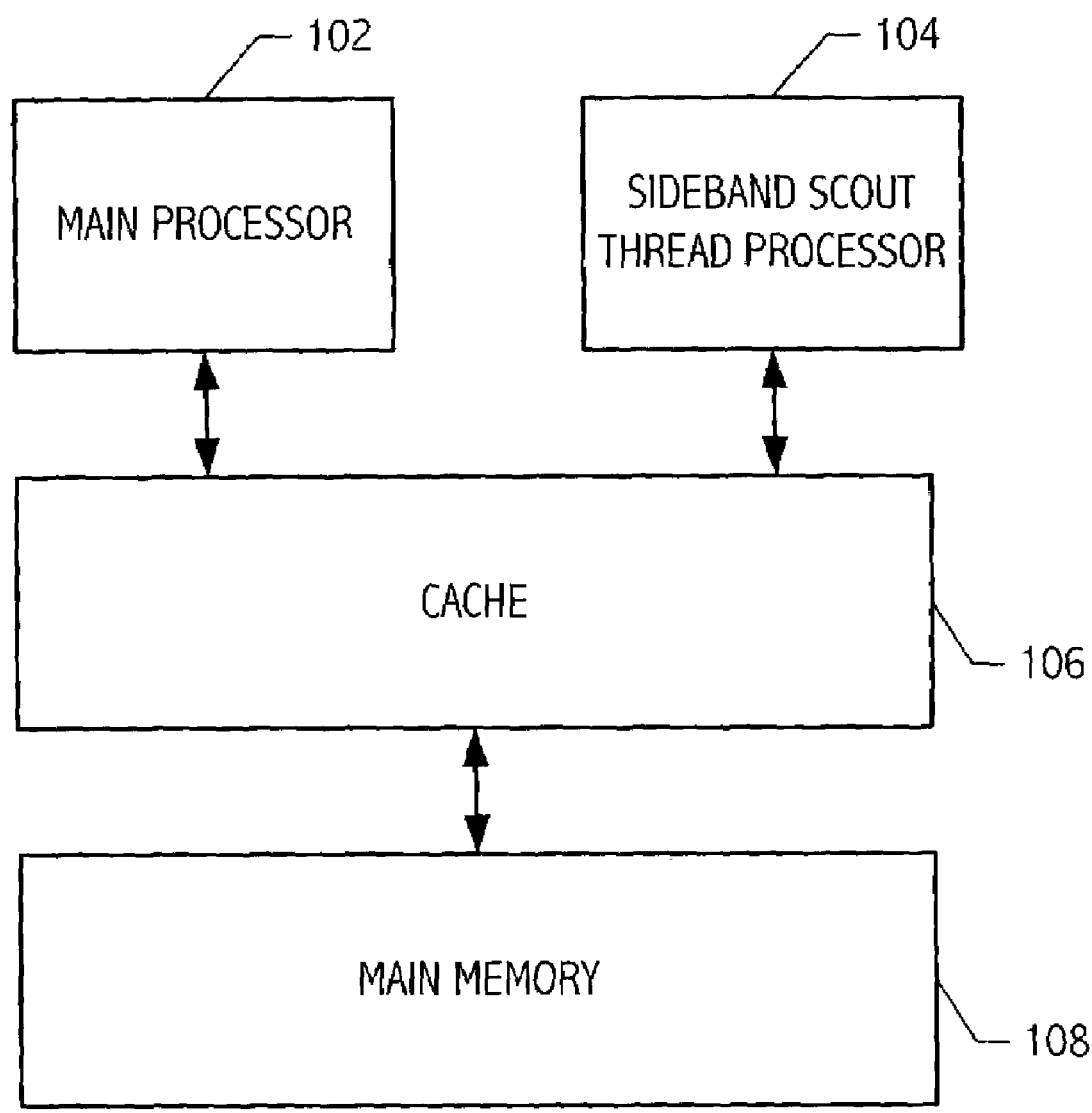
FIG. 1 illustrates an exemplary implementation of a sideband scout thread processing environment according to an embodiment of the present invention.

FIG. 1 illustrates an exemplary implementation of a sideband scout thread processing environment according to an embodiment of the present invention. A main processor 102 executes a main thread. A sideband scout thread processor 104 executes a scout thread formed by parsing the main thread and sideband information. Both processors share a cache 106. As scout thread processor 104 executes the scout thread, variables and instructions are brought into cache 106 from main memory 108. Thus, when main processor 102 executes the main thread, there is a reduced chance of receiving a cache miss. Even if sideband scout thread processor 104 is only 20 cycles ahead of main processor 102, the load latency for main processor 102 due to a cache miss will be reduced by 20 cycles.

Main processor 102 and scout thread processor 104 can be any type of processor, including, for example, superscalar or VLIW. At least two processors can be used for scout thread processing—one for executing the main thread and the other for executing the scout thread. Alternatively, these two processors can be implemented as two virtual processors of a multi-threaded processor where, for example, the scout thread program executes only during stalls of the main thread to avoid resource contention. The scout thread includes a subset of the instructions in the main thread. The scout thread is executed ahead of the main thread to effectively prefetch information into cache to reduce latencies due to cache misses by the main thread. Thus, the main thread executes faster due to reduced delays for accessing information from memory.

Rather than having two separate programs, sideband scout thread processor 104 accesses the main thread instructions. Utilizing direction provided by sideband information, scout thread processor 104 only executes a subset of the main thread instructions. Additionally, the sideband information can instruct sideband scout thread processor 104, for example, where to wait and synchronize with the main thread.

Because sideband scout thread processor 104 executes, for example, only instructions that access memory, sideband scout thread processor can have a reduced architecture. For example, sideband scout thread processor 104 does not need floating point functional units or other specialized units. Additionally, sideband scout thread processor 104 can have a single arithmetic logic unit (ALU) with a memory unit and a branch unit.

Cache 106 is shared between main processor 102 and sideband scout thread processor 104. Cache 106 can be any level: first level, second level, etc. wherein caches farther from the processor are referred to as lower level caches. A shared first level cache provides better latency reduction than does a lower level cache. The cache level where instructions are shared between the processors and the cache level where data is shared between the processors can be different, but both types of shared caches are important for scout thread prefetching of instructions and data.

Main processor 102 and sideband scout thread processor 104 can be implemented as a chip multi-processor (CMP) with both processors residing on the same integrated circuit. Additionally, cache 106 can be implemented on the same integrated circuit. Alternatively, each can be implemented on one or more separate integrated circuits.

Sideband scout thread processor 104 can have a bit in a processor state register to indicate that it is executing speculatively and thus certain faults, traps, or instructions can be ignored, can cause the processor to halt, or can cause the processor to re-synchronize with the main thread.

No communication is necessary between main processor 102 and sideband scout thread processor 104. However, in an alternate embodiment, communication can be provided, for example, including the exchange of such information as branch prediction or synchronization information. For example, the program counter values of the main processor can be sent to the scout thread processor for synchronization or to avoid executing too far ahead or behind the main thread. For example, the main processor can send its program counter value to the scout thread processor on each control transfer instruction. Control transfer instructions include branch, conditional branch, indirect branch, call, return, and the like. Alternatively, the main processor can use the sideband information to determine when to send the program counter values or other messages to the scout thread. In a multi-threaded processor environment, the scout thread can begin execution at the main thread program counter value after a stall and end when the stall is finished.

Superscalar Processor Architecture

Figure 2:
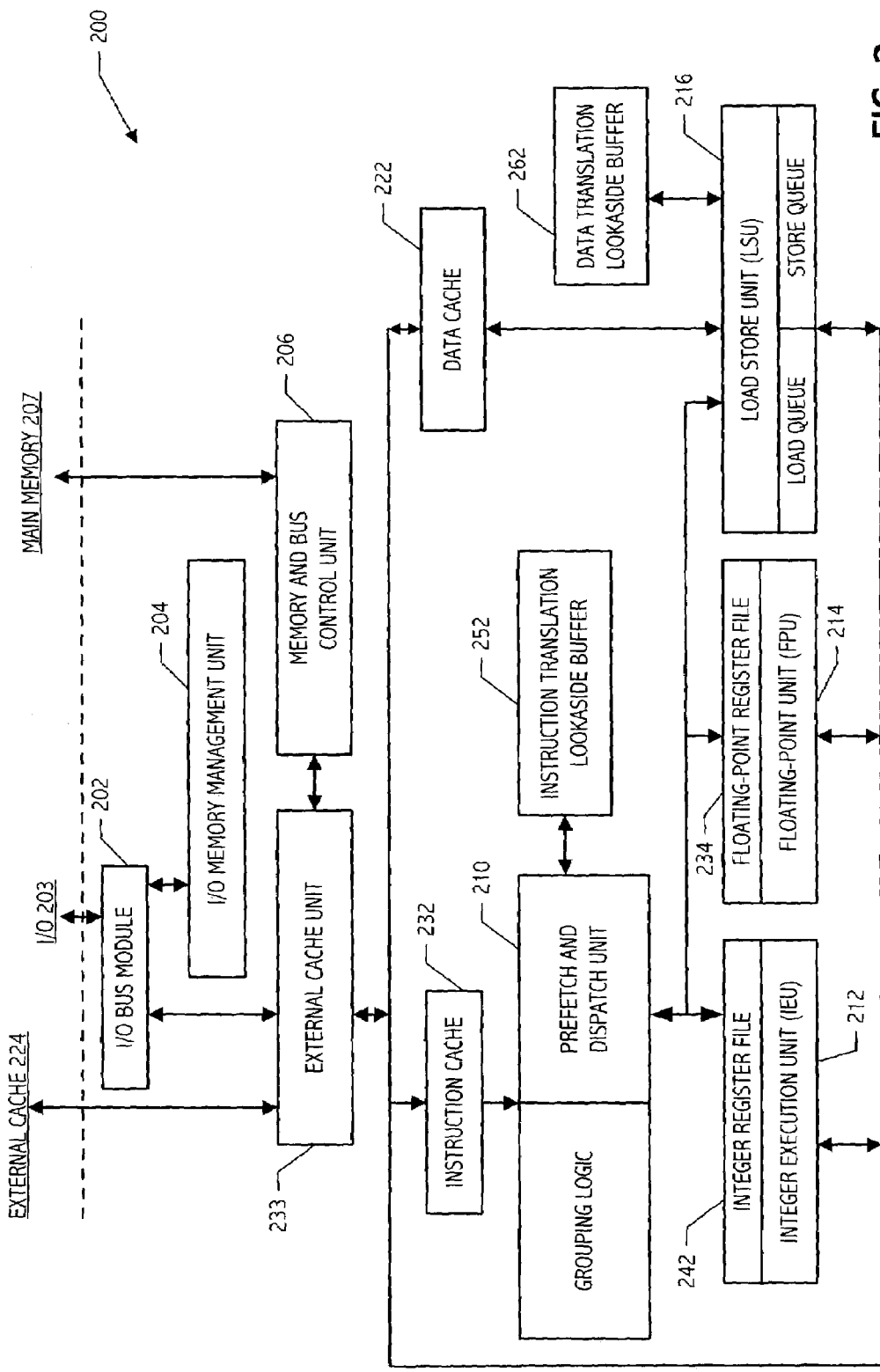
FIG. 2, labeled prior art, illustrates an exemplary superscalar processor architecture.

FIG. 2, labeled prior art, is a block diagram depicting an illustrative superscalar processor architecture. Processor 200 integrates an I/O bus module 202 to interface directly with an I/O bus 203, an I/O memory management unit 204, and a memory and bus control unit 206 to manage all transactions to main memory 207. A Prefetch and Dispatch Unit (PDU) 210 ensures that all execution units, including an Integer Execution Unit (IEU) 212, a Floating Point Unit (FPU) 214, and a Load-Store Unit (LSU) 216, remain busy by fetching instructions before the instructions are needed in the pipeline. A memory hierarchy of processor 200 includes a data cache 222 associated with LSU 216 as well as an external cache 224, main memory 207 and any levels (not specifically shown) of additional cache or buffering. Instructions can be prefetched from all levels of the memory hierarchy, including instruction cache 232, external cache 224, and main memory 207. External cache unit 233 manages all transactions to external cache 224.

A multiple entry, for example, 64-entry, instruction translation lookaside buffer (iTLB) 252 and a multiple entry data TLB (dTLB) 262 provide memory management for instructions and data, respectively. ITLB 252 and dTLB 262 provide mapping between, for example, a 44-bit virtual address and a 41-bit physical address.

Issued instructions are collected, reordered, and then dispatched to IEU 212, FPU 214 and LSU 216 by instruction buffer and grouping logic and a prefetch and dispatch unit (PDU) 210. Instruction reordering allows an implementation to perform some operations in parallel and to better allocate resources. The reordering of instructions is constrained to ensure that the results of program execution are the same as they would be if the instructions were performed in program order (referred to as processor self-consistency). The grouping logic of PDU 210 re-discovers parallelism, spends several cycles analyzing instructions, determining which registers the instructions use, determining instruction dependencies and whether instructions have completed.

IEU 212 can include multiple arithmetic logic units for arithmetic, logical and shift operations, and one or more integer multipliers and dividers. IEU 212 is also integrated with a multi-window internal register file 242 utilized for local storage of operands. In a multi-threaded processor, there are multiple instances of integer register file 242, one instance for each thread. IEU 212 also controls the overall operation of the processor. IEU 212 executes the integer arithmetic instructions and computes memory addresses for loads and stores. IEU 212 also maintains the program counters and may control instruction execution for FPU 214 and LSU 216. This control logic can also be in PDU 210.

FPU 214 can include multiple separate functional units to support floating-point and multimedia operations. These functional units include, for example, multiple multiply, add, divide and graphics units. The separation of execution units enables processor 200 to issue and execute multiple floating-point instructions per cycle. Source and data results are stored in a multi-entry FPU internal register file 234. In a multi-threaded processor, there are multiple instances of FPU internal register file 234, one instance per thread.

LSU 216 is responsible for generating the virtual address of all loads and stores, for accessing the data cache, for decoupling load misses from the pipeline through the load queue, and for decoupling the stores through a store queue. One load or one or more stores can be issued per cycle. During context switches LOAD and STORE instructions save off internal registers to memory.

The design of processor 200 is reminiscent of that of certain SPARC architecture based processors. Note that descriptions and/or terminology consistent with the SPARC architecture are used herein purely for illustrative purposes and, based on the description herein, persons of ordinary skill in the art will appreciate exploitations of the present invention suitable for a wide variety of processor implementations and architectures. SPARC architecture based processors are available from Sun Microsystems, Inc., Santa Clara, Calif. SPARC trademarks are used under license and are trademarks or registered trademarks of SPARC International, Inc. in the United States and other countries. Products bearing SPARC trademarks are based upon an architecture developed by Sun Microsystems, Inc.

Sideband Scout Thread Processor Architecture

Figure 3:
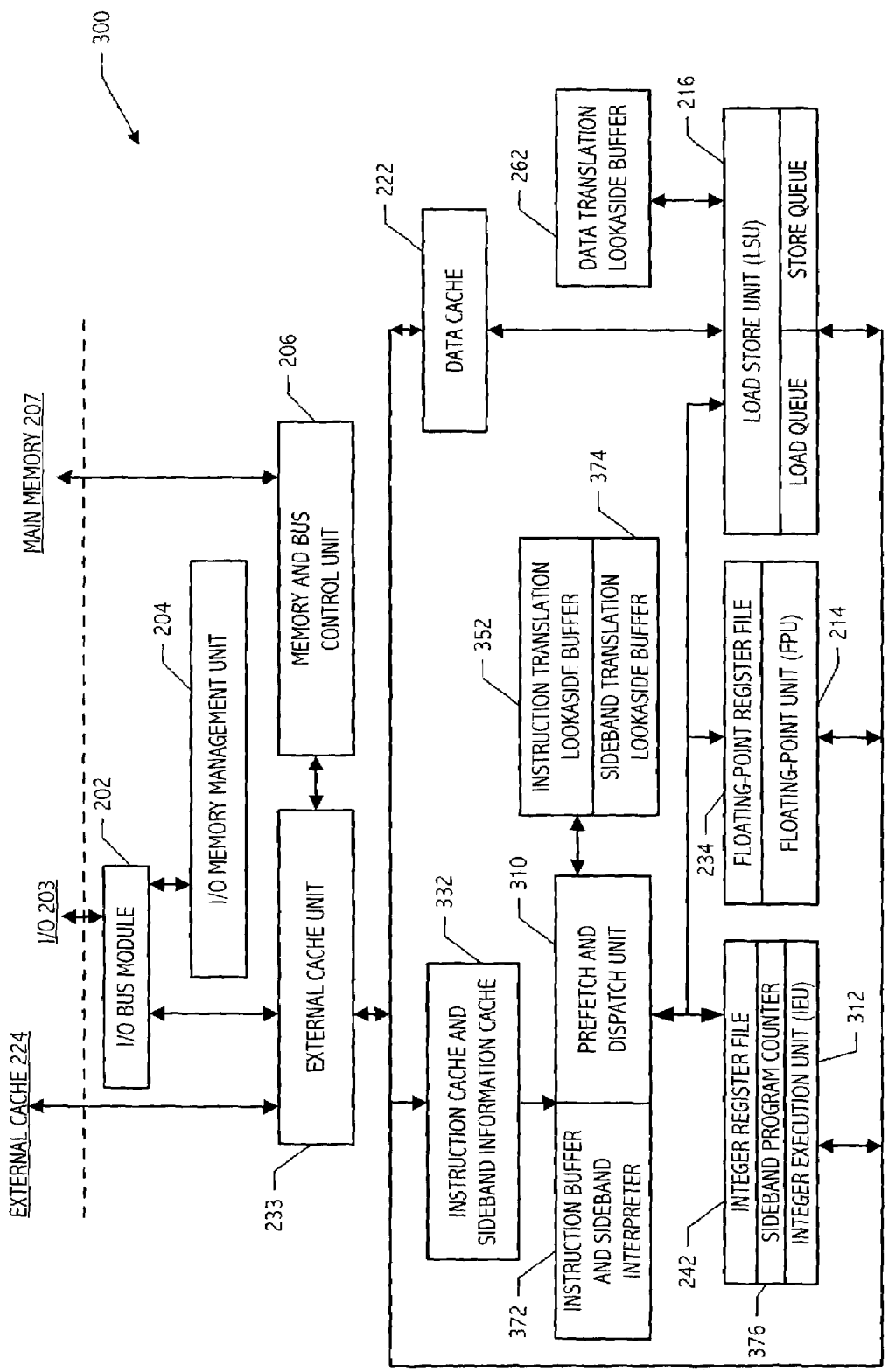
FIG. 3 illustrates an exemplary sideband scout thread processor architecture according to an embodiment of the present invention.

FIG. 3 illustrates a sideband scout thread processor architecture according to an embodiment of the present invention. A sideband scout thread processor 300 is based roughly on superscalar processor 200 with certain functionality differences. In particular, the functionality of PDU 310, IEU 312, instruction cache 332 and iTLB 352 includes sideband information specific circuitry.

Sideband information can be stored in a sideband portion of instruction cache 332. Thus, sideband information can be easily related to individual instructions, and can be accessed quickly by the processor pipeline. Part of filling a line in instruction cache 332 can include finding, decoding, and installing the sideband information for that cache line. Lines from a sideband information file and a corresponding executable file are loaded into instruction cache 332 from, for example, main memory or a disk drive. Alternatively, scout thread processor 300 can have a separate sideband information cache (not shown) rather than combining sideband information with instructions in instruction cache 332.

A sideband interpreter 372 in PDU 310 parses instruction and sideband information and distributes instructions to the various execution units if the sideband information indicates the instruction is to be executed. Thus, the scout thread processor 300 only executes a subset of the instructions in the executable code. The cache shared between the scout thread processor and the main thread processor is warmed up, reducing the likelihood of a cache miss by the main thread processor. Thus, the main thread processor executes the executable code faster.

A sideband TLB 374 in iTLB 352 provides memory management for sideband information. Sideband TLB 374 tracks instruction to sideband information locations. For example, when an instruction takes a branch, the program execution is sent to a different set of instructions. Thus a similar location must be found in the corresponding sideband information. Sideband scout thread processor 300 can alternatively have a separate sideband information TLB (not shown) rather than combining sideband TLB 374 with iTLB 352. When the appropriate translation is not available in sideband TLB 374, sideband scout thread processor 300 can trap to the operating system to fill in the proper translation.

IEU 312 can include multiple arithmetic logic units for arithmetic, logical and shift operations, and one or more integer multipliers and dividers. IEU 312 is also integrated with one or more multi-window internal register files 242 utilized for local storage of operands. IEU 312 also controls the overall operation of the processor. IEU 312 executes the integer arithmetic instructions and computes memory addresses for loads and stores.

In addition, IEU 312 also maintains the program counters and can control instruction execution for FPU 214 and LSU 216. This control logic can also be in PDU 210. IEU 312 also maintains a sideband program counter 376 to track similar locations in the sideband information. Thus, sideband TLB 374 and sideband program counter 376 can be used in conjunction to track and translate instruction addresses to the corresponding sideband information addresses.

In order to keep the scout thread ahead of the main thread, but not too far ahead, some form of synchronization between the main thread processor and the scout thread processor is preferable. This synchronization can be performed with normal memory operations, or new instructions added to the instruction set or certain parts of the processor state. For example, the program counter value can be communicated from the main thread to the scout thread. Indications of these synchronization points and how they are to be accomplished can also be included in the sideband information.

Although sideband scout thread processor 300 has been illustrated as a superscalar processor, a sideband scout thread processor can be of any processor type, for example, VLIW or single-scalar.

Sideband scout thread processor 300 can load the program executable code into instruction cache and sideband information cache 332. Sideband scout thread processor 300 can execute only the instructions indicated by the sideband information and skip the others. The executed instructions should have the side-effect of loading values required by the main processor into the shared cache. Thus the data needed by the main thread is moved closer to the main processor, improving its performance by reducing latencies due to cache misses.

The main thread processor (not shown) can be implemented as a normal processor, similar to processor 200 illustrated in FIG. 2, or the main thread processor can be implemented similar to scout thread processor 300 illustrated in FIG. 3, but with a special configuration register, for example, a bit in the processor state register, that indicates if a main thread or a scout thread is currently executing. The advantage of implementing the main thread as a scout thread processor is that the sideband information can be interpreted by the main thread and used for indications of when to communicate with, or start or stop the scout thread. Alternatively, the main thread processor and the scout thread processor can be implemented as two threads on a multi-threaded processor similar to the sideband scout thread processor 300.

Sideband Information

According to an embodiment of the present invention, sideband information corresponding to an executable file is provided. The sideband information can be used by a scout thread processor to bring variables and instructions into the shared cache to reduce the likelihood of the main processor having a cache miss. Sideband information is not part of the executable portion of the program file, but "off-to-the-side", either in the same file or a different file. No changes are made to the executable file. The sideband information can be ignored by the main thread processor executing the executable file.

Figure 4A:
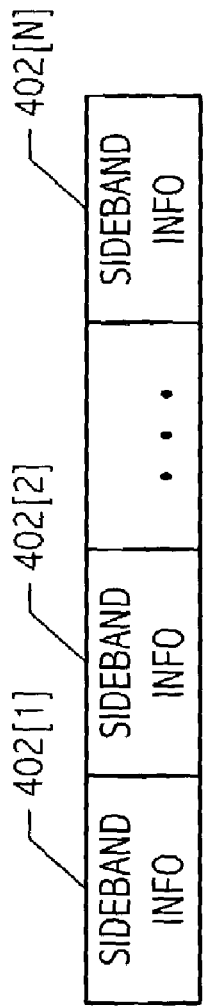
FIGS. 4A-4B illustrate exemplary sideband information encoding formats according to embodiments of the present invention.
Figure 4B:
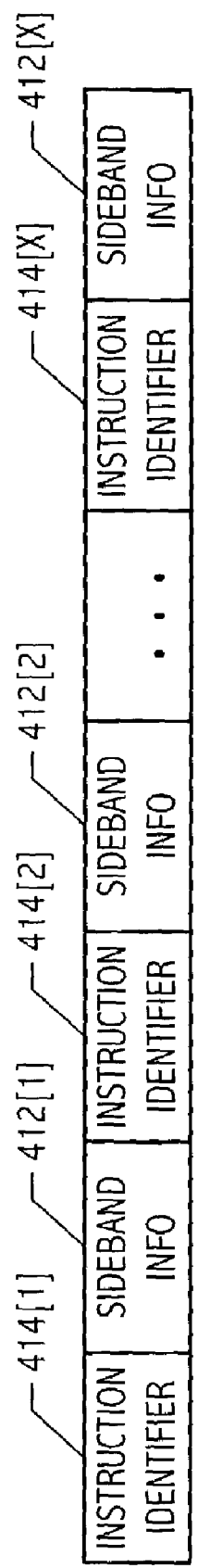

Sideband information is encoded so that a scout thread processor can determine which instruction corresponds to which portion of the sideband information. The sideband information can be encoded in many different ways. FIGS. 4A-4B illustrate exemplary encoding formats for sideband information according to embodiments of the present invention.

FIG. 4A illustrates a fixed size sideband information encoding according to an embodiment of the present invention. As shown, multiple groups of sideband information 402[1:N] have a fixed size and correspond to N instructions in associated executable code (i.e., the main thread). Sideband information 402[1] corresponds to a first instruction, sideband information 402[2] corresponds to a second instruction, and so on. Using a base address of the sideband information and a fixed size of the portion of the sideband information relating to a particular address, for example two bytes, the sideband information relating to the sixth instruction would be found at the base address plus 12 bytes locations. In its simplest form, sideband information can be one bit corresponding to each processor instruction in the executable code. Thus, when active, the bit would indicate an instruction to be executed by the scout thread processor. If a bit was inactive, the corresponding instruction would be skipped.

If the sideband information per instruction is the same size as an instruction, then the sideband information address can be computed as follows: the instruction counter address can be broken into a page number plus a page offset, and the instruction page number mapped to a sideband information page number, and the sideband information address computed as the sideband information page number plus the page offset from the instruction counter address.

If the sideband information per instruction differs by a constant scale factor from the instruction size, then the sideband information address can be computed as follows: the instruction addresses can be partitioned into base and size contiguous segments, and the program counter address can be used to search the set of base and size pairs to find the instruction segment base and size. This instruction segment can be mapped to an associated sideband information segment with a base and size, and the sideband information address can be computed as: (instruction address−instruction segment base) * scale factor+sideband information base.

Sideband TLB 254 can contain a searchable set of entries. For example, a search for a particular entry can be based on instruction page address and sideband information page address. Alternatively, a search for a particular entry can be based on instruction segment base address, instruction segment size, sideband information segment base address, and a scaling factor.

FIG. 4B illustrates an encoding with explicit instruction identification encoding according to an embodiment of the present invention. Each group of sideband information 412 [1:X] is preceded by one or more bytes 414[1:X] indicating a corresponding instruction in the executable file. Sideband information is related to the original instructions, for example, by specifying addresses (program counter values) in the executable program to which the sideband information corresponds. The correspondence between the sideband information and the executable code can be, for example, at the individual instruction level or at the page level.

Sideband information identifies a subset of the main thread instructions, for example, instructions that access memory and calculate addresses. Thus, the scout thread processing brings data into the cache, resulting in the main thread processor having fewer cache misses and therefore shorter latencies. The scout thread only needs to execute enough instructions to prefetch data and instructions into the cache. Thus, the scout thread processor needs to execute the memory operations, although the memory operations are modified to be speculative, such that the loads are speculative loads or non-faulting loads or prefetches, and the stores are prefetches. In order to generate proper addresses for the loads and stores, all address arithmetic, generally integer arithmetic, needs to be executed. In addition, the control-flow instructions, for example, branches, conditional branches, and calls and returns, need to be executed in order to determine which memory operations to execute in the scout thread. Thus, instructions that are not needed include instructions that are computing data that will be stored, because the stores are converted into prefetches and don't actually store any data. Certain instructions can be skipped for other reasons, for example, if a load is known to hit in the cache, then it might be skipped by the scout thread. Certain instructions that may cause exceptions can also be skipped to avoid any side-effects, and instructions that depend on an instruction already skipped can also be skipped.

In addition to indicating which instructions are to be executed by the sideband scout thread processor, sideband information can contain synchronization information, for example, indicating where the two processors need to wait for each other.

Sideband Compiler Architecture

Sideband information can be provided by a sideband compiler during the translation of source code into an executable file. Alternatively, a software tool can read a previously compiled executable file and produce the sideband information.

Source code written by a programmer is a list of statements in a programming language such as C, Pascal, Fortran and the like. Programmers perform all work in the source code, changing the statements to fix bugs, adding features, or altering the appearance of the source code. A compiler is typically a software program that converts the source code into an executable file that a computer or other machine can understand. The executable file is in a binary format and is often referred to a binary code. Binary code is a list of instruction codes that a processor of a computer system is designed to recognize and execute. Binary code can be executed over and over again without recompilation. The conversion or compilation from source code into binary code is typically a one-way process. Conversion from binary code back into the original source code is typically impossible.

A different compiler is required for each type of source code language and target machine or processor. For example, a Fortran compiler typically can not compile a program written in C source code. Also, processors from different manufacturers typically require different binary code and therefore a different compiler or compiler options because each processor is designed to understand a specific instruction set or binary code. For example, an Apple Macintosh's processor understands a different binary code than an IBM PC's processor. Thus, a different compiler or compiler options would be used to compile a source program for each of these types of computers.

Figure 5A:
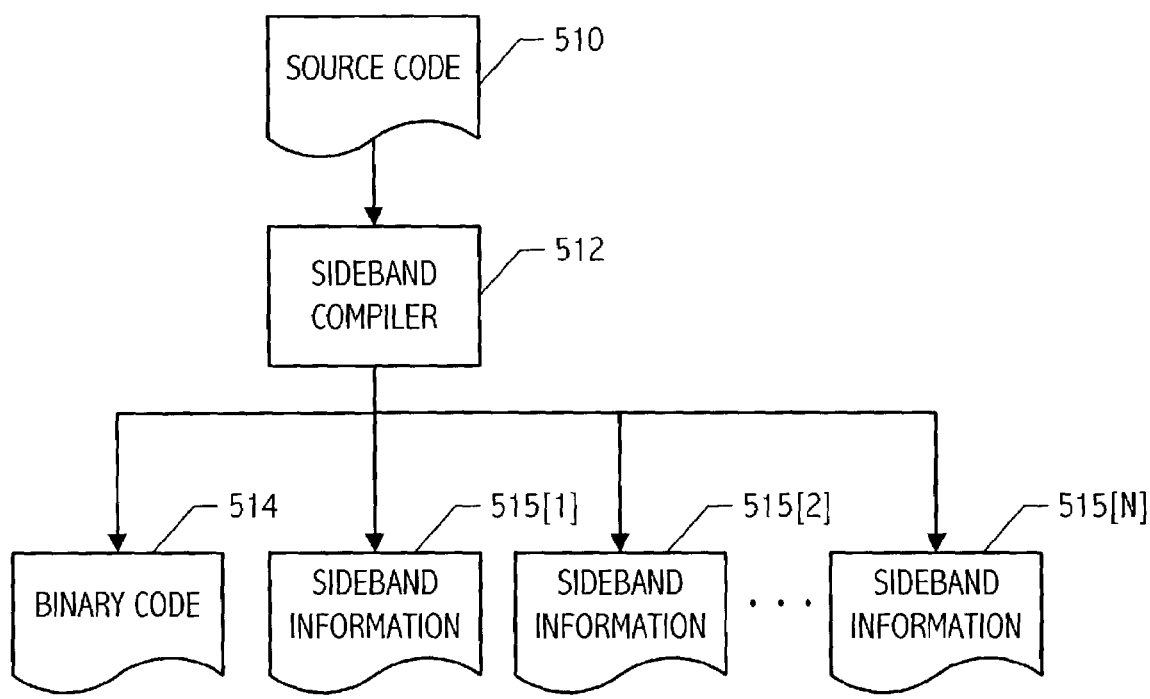
FIGS. 5A-5B illustrate an exemplary compiler according to an embodiment of the present invention.

FIG. 5A illustrates an exemplary compilation process according to an embodiment of the present invention. Source code 510 is read into sideband compiler 512. Source code 512 is a list of statements in a programming language such as C, Pascal, Fortran and the like. Sideband compiler 512 collects and reorganizes (compiles) all of the statements in source code 510 to produce a binary code 514 and a sideband information 515. Binary code 514 is an executable file in a binary format and is a list of instruction codes that a processor of a computer system is designed to recognize and execute. Sideband information can be included in the same file as the executable code, or alternatively, in one or more separate files. An exemplary compiler architecture according to an embodiment of the present invention is shown in FIG. 5B.

In the compilation process, sideband compiler 512 examines the entire set of statements in source code 510 and collects and reorganizes the statements. Each statement in source code 510 can translate to many machine language instructions or binary code instructions in binary code 514. There is seldom a one-to-one translation between source code 510 and binary code 514. During the compilation process, sideband compiler 512 may find references in source code 510 to programs, sub-routines and special functions that have already been written and compiled. Sideband compiler 512 typically obtains the reference code from a library of stored sub-programs which is kept in storage and inserts the reference code into binary code 514. Binary code 514 is often the same as or similar to the machine code understood by a computer. If binary code 514 is the same as the machine code, the computer can run binary code 514 immediately after sideband compiler 512 produces the translation. If binary code 514 is not in machine language, other programs (not shown)—such as assemblers, binders, linkers, and loaders—finish the conversion to machine language. Sideband compiler 512 differs from an interpreter, which analyzes and executes each line of source code 510 in succession, without looking at the entire program. Although a just-in-time (JIT) interpreter can be used to generate sideband information, the JIT interpreter will add extra run-time overhead and not produce as thorough a result as a compiler.

Figure 5B:
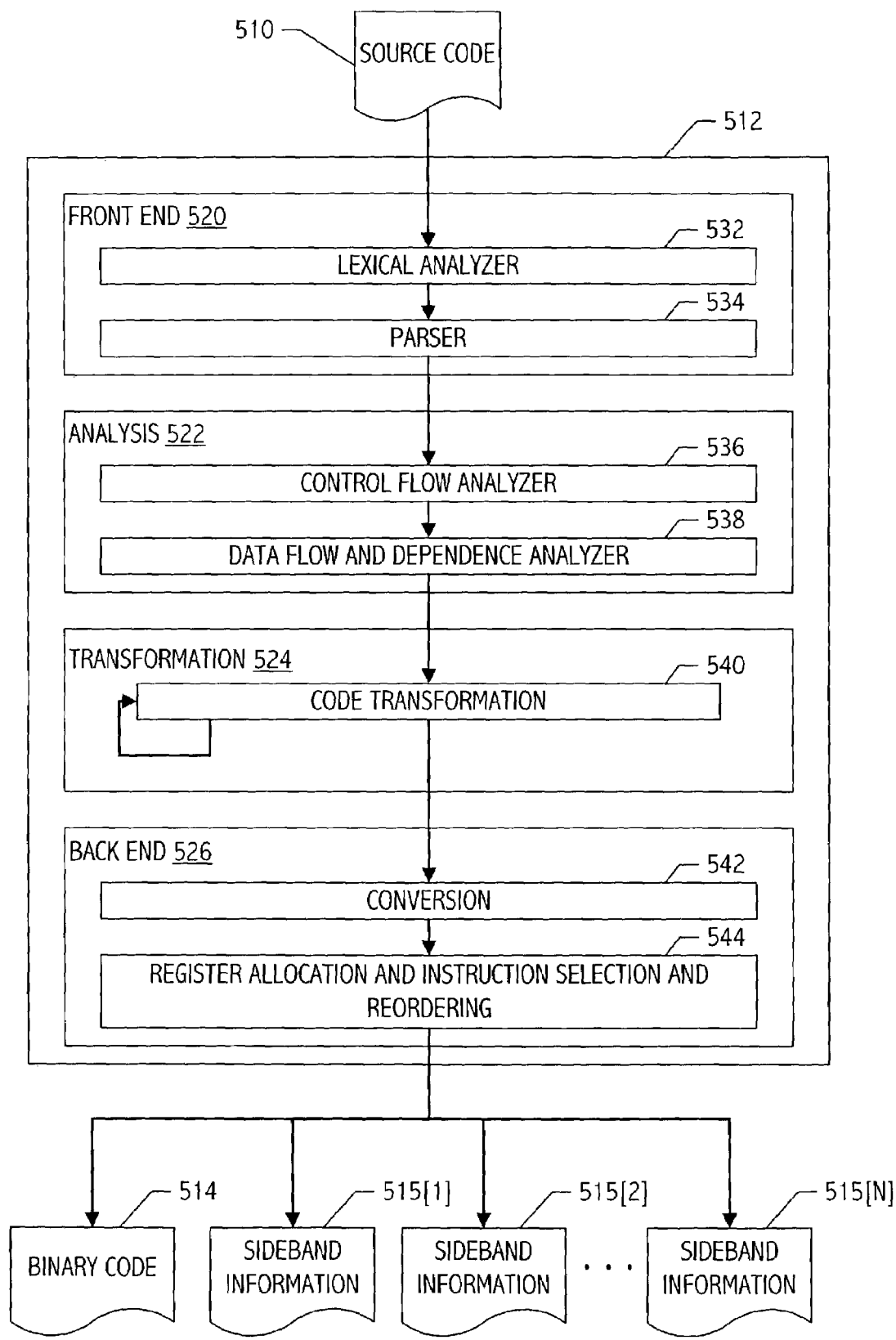

FIG. 5B illustrates an exemplary compiler architecture for sideband compiler 512 according to an embodiment of the present invention. Compiler architectures can vary widely; the exemplary architecture shown in FIG. 5B includes common functions that are present in most compilers. Other compilers can contain fewer or more functions and can have different organizations. Sideband compiler 512 contains a front-end function 520, an analysis function 522, a transformation function 524, and a back-end function 526.

Front-end function 520 is responsible for converting source code 510 into more convenient internal data structures and for checking whether the static syntactic and semantic constraints of the source code language have been properly satisfied. Front-end function 520 typically includes two phases, a lexical analyzer 532 and a parser 534. Lexical analyzer 532 separates characters of the source language into groups that logically belong together; these groups are referred to as tokens. The usual tokens are keywords, such as DO or IF, identifiers, such as X or NUM, operator symbols, such as <=or +, and punctuation symbols such as parentheses or commas. The output of lexical analyzer 532 is a stream of tokens, which is passed to the next phase, parser 534. The tokens in this stream can be represented by codes, for example, DO can be represented by 1, + by 2, and "identifier" by 3. In the case of a token like "identifier," a second quantity, telling which of those identifiers used by the code is represented by this instance of token "identifier," is passed along with the code for "identifier." Parser 534 groups tokens together into syntactic structures. For example, the three tokens representing A+B might be grouped into a syntactic structure called an expression. Expressions might further be combined to form statements. Often the syntactic structure can be regarded as a tree whose leaves are the token. The interior nodes of the tree represent strings of tokens that logically belong together.

Analysis function 522 can take many forms. A control flow analyzer 536 produces a control-flow graph (CFG). The control-flow graph converts the different kinds of control transfer constructs in a source code 510 into a single form that is easier for sideband compiler 512 to manipulate. A data flow and dependence analyzer 538 examines how data is being used in source code 510. Analysis function 522 typically uses program dependence graphs and static single-assignment form, and dependence vectors. Some compilers only use one or two of the intermediate forms, while others use entirely different ones.

After analyzing source code 510, sideband compiler 512 can begin to transform source code 510 into a high-level representation. Although FIG. 5B implies that analysis function 522 is complete before transformation function 524 is applied, in practice it is often necessary to re-analyze the resulting code after source code 510 has been modified. One primary difference between the high-level representation code and binary code 514 is that the high-level representation code need not specify the registers to be used for each operation.

Code optimization (not shown) is an optional phase designed to improve the high-level representation code so that binary code 514 runs faster and/or takes less space. The output of code optimization is another intermediate code program that does the same job as the original, but perhaps in a way that saves time and/or space.

Once source code 510 has been fully transformed into a high-level representation, the last stage of compilation is to convert the resulting code into binary code 514. Back-end function 526 contains a conversion function 542 and a register allocation and instruction selection and reordering function 544. Conversion function 542 converts the high-level representation used during transformation into a low-level register-transfer language (RTL). RTL can be used for register allocation, instruction selection, and instruction reordering to exploit processor scheduling policies.

A table-management portion (not shown) of sideband compiler 512 keeps track of the names used by the code and records essential information about each, such as its type (integer, real, floating point, etc.). The data structure used to recode this information is called a symbol table.

Sideband compiler 512 generates binary code 514 and sideband information 515 while compiling source code 510. Alternatively, a software tool can read binary code 514 and generate sideband information 515 identifying instructions for the sideband scout thread processor to execute and other information. As such, sideband information can be provided with an executable file to improve the execution time of the executable file by executing a scout thread and bringing needed variables into cache memory.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow.

What is claimed is:

1. A method for executing a main thread, comprising:
   obtaining the main thread, wherein the main thread comprises a plurality of instructions;
   obtaining sideband information associated with the main thread;
   selecting a first instruction of the plurality of instructions using the sideband information, wherein the first instruction retrieves a value;
   executing the first instruction using a first processor to load the value from a main memory to a cache memory; and
   executing the first instruction using a second processor to retrieve the value from the cache memory after executing the first instruction using the first processor.

2. The method of claim 1, wherein the plurality of instructions and the sideband information are stored in different files.

3. The method of claim 1, further comprising:
   generating the main thread and the sideband information from source code using a sideband compiler.

4. The method of claim 1, further comprising:
   generating the sideband information from the main thread using a software tool.

5. The method of claim 1, wherein the plurality of instructions and the sideband information are stored in an executable file.

6. The method of claim 1, further comprising:
   sending a program counter (PC) value of the second processor to the first processor on a control transfer instruction of the plurality of instructions.

7. The method of claim 6, further comprising:
   synchronizing the first processor with the second processor based on the PC value.

8. The method of claim 1, further comprising:
   selecting a second instruction of the plurality of instructions using the sideband information;
   suspending the first processor for a predetermined amount of time after receiving a program counter value from the second processor;
   resuming the first processor to execute the second instruction after the predetermined amount of time; and
   executing the second instruction using the second processor after executing the second instruction using the first processor.

9. The method of claim 1, wherein the sideband information is encoded into a plurality of blocks.

10. The method of claim 9, wherein selecting the first instruction comprises:
    obtaining a size of a block of the plurality of blocks;
    obtaining a position of the first instruction in the plurality of instructions;
    adding a product of the position and the size to a base address to generate a sum, wherein the plurality of blocks are stored starting at the base address; and
    accessing the information stored at a location addressed by the sum to determine the first instruction requires execution by the first processor.

11. The method of claim 9, wherein each of the plurality of blocks is preceded by at least one of the plurality of instructions.

12. The method of claim 1, wherein selecting the first instruction comprises:
partitioning an instruction counter address into a main thread page number and an offset;
mapping the main thread page number to a sideband page;
adding the offset to a base address of the sideband page to generate a sum; and
accessing information stored at a location addressed by the sum to determine the first instruction requires execution by the first processor.

13. The method of claim 1, wherein the first processor is a sideband scout processor and the second processor is a main processor.

14. The method of claim 1, further comprising:
excluding a second instruction of the plurality of instructions from execution by the first processor before executing the main thread using the second processor.

15. A computer readable medium storing instructions to execute a main thread, the instruction comprising functionality to:
obtain the main thread, wherein the main thread comprises a plurality of instructions;
obtain sideband information associated with the main thread;
select a first instruction of the plurality of instructions using the sideband information, wherein the first instruction retrieves a value;
execute the first instruction using a first processor to load the value from a main memory to a cache memory; and
execute the first instruction using a second processor to retrieve the value from the cache memory after executing the first instruction using the first processor.

16. The computer readable medium of claim 15, wherein the plurality of instructions and the sideband information are stored in different files.

17. The computer readable medium of claim 15, the instructions further comprising functionality to:
generate the main thread and the sideband information from source code using a sideband compiler.

18. The computer readable medium of claim 15, the instructions further comprising functionality to:
generate the sideband information from the main thread using a software tool.

19. The computer readable medium of claim 15, wherein the plurality of instructions and the sideband information are stored in an executable file.

20. The computer readable medium of claim 15, the instructions further comprising functionality to:
send a program counter (PC) value of the second processor to the first processor on a control transfer instruction of the plurality of instructions.

21. The computer readable medium of claim 20, the instructions further comprising functionality to:
synchronize the first processor with the second processor based on the PC value.

22. The computer readable medium of claim 15, the instructions further comprising functionality to:
select a second instruction of the plurality of instructions using the sideband information;
suspend the first processor for a predetermined amount of time after receiving a program counter value from the second processor;
resume the first processor to execute the second instruction after the predetermined amount of time; and
execute the second instruction using the second processor after executing the second instruction using the first processor.

23. The computer readable medium of claim 15, wherein the sideband information is encoded into a plurality of blocks.

24. The computer readable medium of claim 23, wherein the instructions to select the first instruction comprise functionality to:
obtain a size of a block of the plurality of blocks;
obtain a position of the first instruction in the plurality of instructions;
add a product of the position and the size to a base address to generate a sum, wherein the plurality of blocks are stored starting at the base address; and
access the information stored at a location addressed by the sum to determine the first instruction requires execution by the first processor.

25. The computer readable medium of claim 23, wherein each of the plurality of blocks is preceded by at least one of the plurality of instructions.

26. The computer readable medium of claim 15, wherein the instructions to select the first instruction comprise functionality to:
partition an instruction counter address into a main thread page number and an offset;
map the main thread page number to a sideband page;
add the offset to a base address of the sideband page to generate a sum; and
access information stored at a location addressed by the sum to determine the first instruction requires execution by the first processor.

27. The computer readable medium of claim 15, wherein the first processor is a sideband scout processor and the second processor is a main processor.

28. The computer readable medium of claim 15, the instructions further comprising functionality to:
exclude a second instruction of the plurality of instructions from execution by the first processor before executing the main thread using the second processor.

29. An apparatus for executing a main thread, comprising:
means for obtaining the main thread, wherein the main thread comprises a plurality of instructions;
means for obtaining sideband information associated with the main thread;
means for selecting a first instruction of the plurality of instructions using the sideband information, wherein the first instruction retrieves a value;
means for executing the first instruction using a first processor to load the value from a main memory to a cache memory; and
means for executing the first instruction using a second processor to retrieve the value from the cache memory after executing the first instruction using the first processor.

30. The apparatus of claim 29, wherein the plurality of instructions and the sideband information are stored in different files.

31. The apparatus of claim 29, further comprising:
means for generating the main thread and the sideband information from source code using a sideband compiler.

32. The apparatus of claim 29, further comprising:
means for generating the sideband information from the main thread using a software tool.

33. The apparatus of claim 29, wherein the plurality of instructions and the sideband information are stored in an executable file.

34. The apparatus of claim 29, further comprising:
means for sending a program counter (PC) value of the second processor to the first processor on a control transfer instruction of the plurality of instructions.

35. The apparatus of claim 34, further comprising:
means for synchronizing the first processor with the second processor based on the PC value.

36. The apparatus of claim 29, further comprising:
means for selecting a second instruction of the plurality of instructions using the sideband information;
means for suspending the first processor for a predetermined amount of time after receiving a program counter value from the second processor;
means for resuming the first processor to execute the second instruction after the predetermined amount of time; and
means for executing the second instruction using the second processor after executing the second instruction using the first processor.

37. The apparatus of claim 29, wherein the sideband information is encoded into a plurality of blocks.

38. The apparatus of claim 37, wherein means for selecting the first instruction comprises:
means for obtaining a size of a block of the plurality of blocks;
means for obtaining a position of the first instruction in the plurality of instructions;
means for adding a product of the position and the size to a base address to generate a sum, wherein the plurality of blocks are stored starting at the base address; and
means for accessing the information stored at a location addressed by the sum to determine the first instruction requires execution by the first processor.

39. The apparatus of claim 37, wherein each of the plurality of blocks is preceded by at least one of the plurality of instructions.

40. The apparatus of claim 29, wherein means for selecting the first instruction comprises:
means for partitioning an instruction counter address into a main thread page number and an offset;
means for mapping the main thread page number to a sideband page;
means for adding the offset to a base address of the sideband page to generate a sum; and
means for accessing information stored at a location addressed by the sum to determine the first instruction requires execution by the first processor.

41. The apparatus of claim 29, wherein the first processor is a sideband scout processor and the second processor is a main processor.

42. The apparatus of claim 29, further comprising:
means for excluding a second instruction of the plurality of instructions from execution by the first processor before executing the main thread using the second processor.

43. A system for executing a main thread, comprising:
a main memory;
an external cache;
an instruction cache storing a plurality of instructions, wherein the plurality of instructions is associated with the main thread;
a sideband interpreter operatively connected to the instruction cache and configured to select a first instruction of the plurality of instructions by parsing sideband information associated with the plurality of instructions;
an execution unit operatively connected to the instruction cache, the main memory, and the external cache, wherein the execution unit is configured to execute the first instruction to load a value from the main memory to the external cache after parsing the sideband information,
wherein the instruction cache, the sideband interpreter, and the execution unit are associated with a sideband scout (SS) processor; and
a main processor operatively connected to the external cache and configured to execute the first instruction to retrieve the value from the external cache after the execution unit executes the first instruction.

44. The system of claim 43, further comprising:
a sideband cache operatively connected to the sideband interpreter and configured to store the sideband information.

45. The system of claim 43, wherein the sideband information comprises synchronization points for synchronizing the first processor and the second processor.

46. The system of claim 43, wherein the external cache is a first level cache.

47. The system of claim 43, wherein the external cache is a second level cache.

48. The system of claim 43, wherein the sideband information is encoded into a plurality of blocks.

49. The system of claim 48, wherein each of the plurality of blocks is mapped to one of the plurality of instructions.

50. The system of claim 48, wherein each of the plurality of blocks is a bit in size.

51. The system of claim 48, wherein the plurality of blocks is stored in the instruction cache and each of the plurality of blocks is preceded by one of the plurality of instructions.

52. The system of claim 43, wherein the SS processor is configured to select a second instruction of the plurality of instructions and execute the second instruction after synchronizing with the main processor, and wherein the main processor is configured to execute the second instruction after the SS processor executes the second instruction.

53. The system of claim 43, wherein the main processor communicates branch prediction information of the plurality of instructions to the SS processor.

54. The system of claim 43, wherein the SS processor comprises a sideband program counter and a sideband translation look-aside buffer to translate an address of the first instruction to an address in the sideband information.

55. The system of claim 43, wherein the SS processor is configured to suspend operation after receiving a message from the main processor.

56. The system of claim 43, further comprising:
an integrated circuit including the SS processor and the main processor.

* * * * *